United States Patent [19]
Hawkins et al.

[11] Patent Number: 6,154,254
[45] Date of Patent: Nov. 28, 2000

[54] ELECTRONIC CAMERA FOR PRODUCING A DIGITAL IMAGE HAVING A MULTIMODE MICROFLUIDIC PRINTING DEVICE

[75] Inventors: Gilbert A. Hawkins, Mendon; Xin Wen, Rochester; Dale F. McIntyre, Honeoye Falls, all of N.Y.

[73] Assignee: Eastman Kodak Company, Rochester, N.Y.

[21] Appl. No.: 08/950,703

[22] Filed: Oct. 15, 1997

[51] Int. Cl.$^7$ .................................................. H04N 5/225
[52] U.S. Cl. ............................ 348/374; 348/207; 355/32
[58] Field of Search ................................. 348/207, 374; 358/906, 909.1; 347/2, 3; 355/32

[56] References Cited

U.S. PATENT DOCUMENTS

| | | | |
|---|---|---|---|
| 4,314,263 | 2/1982 | Carley ........................................ | 347/48 |
| 4,533,928 | 8/1985 | Sugiura et al. .............................. | 347/3 |
| 5,850,297 | 12/1998 | Honda ...................................... | 358/474 |
| 5,877,580 | 3/1999 | Swierkowski ............................ | 310/328 |
| 5,975,677 | 11/1999 | Marler et al. .............................. | 347/40 |
| 6,022,482 | 2/2000 | Chen et al. ................................ | 347/65 |

OTHER PUBLICATIONS

"Electroosmosis: A Reliable Fluid Propulsion System for Flow Injection Analysis", Anal. Chem. 66, pp. 1792–1798 (1994).

Primary Examiner—Tuan Ho
Assistant Examiner—Mitchell White
Attorney, Agent, or Firm—Raymond L. Owens

[57] ABSTRACT

An electronic camera for producing a digital image and a multimode microfluidic printing device for printing such digital image including a parallel associative interface structure having an image sensor in the camera for producing digital images and a microfluidic printing device including a plurality of colored ink reservoirs including several reservoirs for containing different colorants and a plurality of colorant delivery chambers. Circuitry responds to digital image produced by the sensor for image processing the digital image produced by the image sensor for controlling the microfluidic printing device to deliver colorants from the delivery chambers to an image transfer position. An image receiving medium is delivered to such medium to produce a visual image of the digital image.

11 Claims, 10 Drawing Sheets

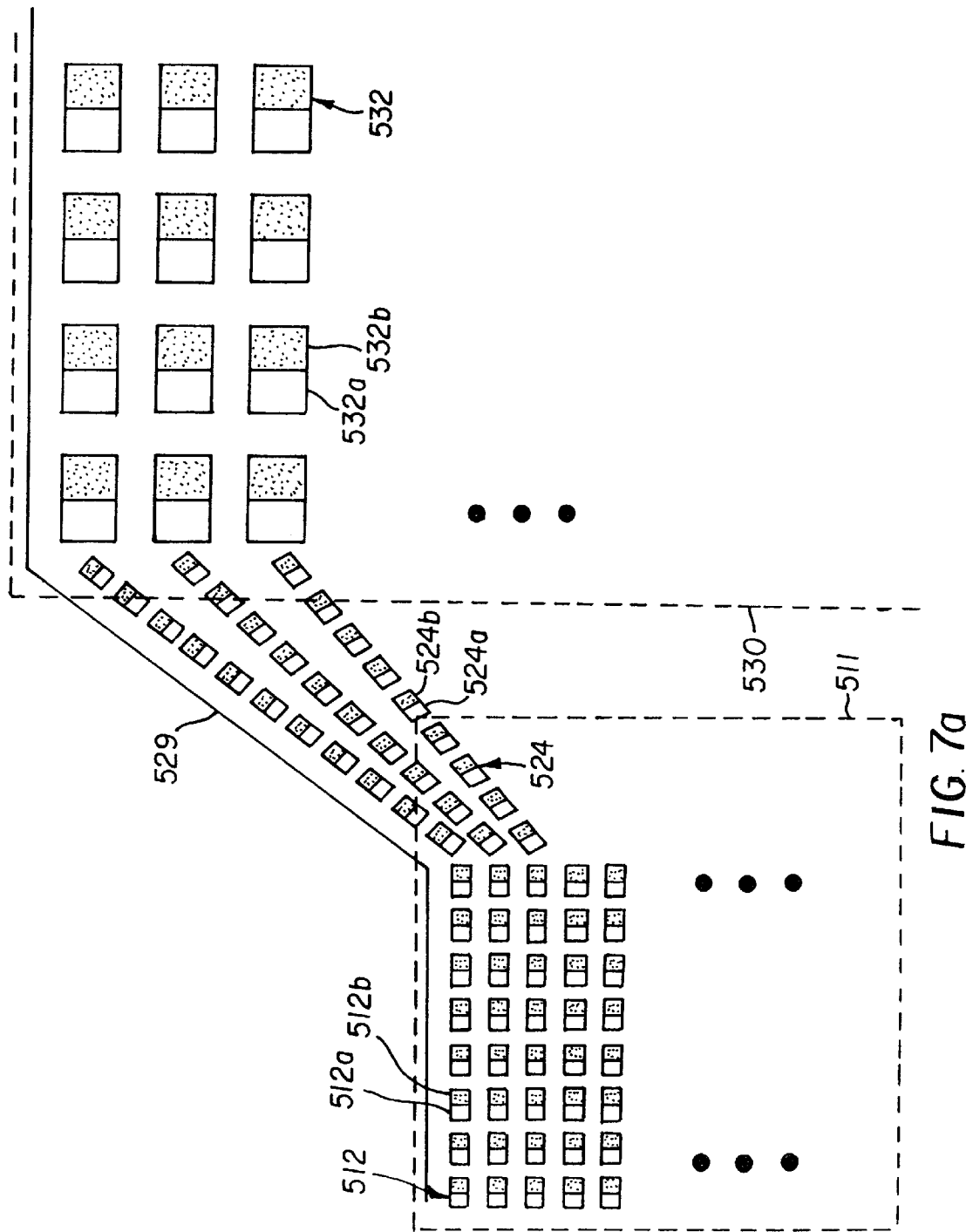

ELECTRONIC CAMERA FOR PRODUCING A DIGITAL IMAGE HAVING A MULTIMODE MICROFLUIDIC PRINTING DEVICE

CROSS REFERENCE TO RELATED APPLICATIONS

The present invention is related to commonly assigned and concurrently applied U.S. patent application No. 08/951,017 filed Oct. 15, 1997, entitled "Camera with Microfluidic Printer" to Dale McIntyre, assigned to the assignee of the present invention. The disclosure of this related application is incorporated herein by reference.

FIELD OF THE INVENTION

The present invention relates to the field of image capture and image reproduction.

BACKGROUND OF THE INVENTION

In the field of photography, there has been a long recognized need for convenient image printing and/or displaying after an image is captured. The users like to examine, store, share, edit, manage, and communicate the captured images in a timely fashion. Furthermore, it is highly desirable for the all functions to be provided in a compact system so that the users can use them a portable fashion.

Several commercial products have attempted to address the above needs: one of these product is the instant photographic cameras based on the silver halide photographic technologies. The images are captured by sensitized emulsion grains and the images are formed on a photographic paper. This product, however, does not provide the users the capabilities of storing, editing, managing, and electronically communicating the captured images.

FIG. 1 shows another type of commercial product comprising an electronic camera and a digital printer. The camera-printer system 5 comprises a camera 10 and a printer 40. In the configuration shown in FIG. 1, the camera 10 includes an image sensor 20, an image processing unit 30, and a microcontroller 50. It is understood that the image processing unit 30 and the microcontroller 50 can also be stand alone or inside the printer 40. The camera-printer system 5 may also include a user input and a display. A common image sensor 20 is in a charge-coupled device (CCD) configuration. A detailed diagram of a CCD sensor is shown in FIG. 2.

In a typical operation of the camera-printer system 5, the image of a scene is captured by the image sensor 20. The image sensor 20 comprises a plurality of light detecting elements 60. The photons from the original scene are captured by the two dimensional array of light detecting elements 60, the photons being absorbed by the light sensitive material in the light detecting elements 60. Electron charges are then generated by electronic excitations. The number of the electron charges within each light detecting element 60 is directly related to the number of photons being absorbed by the light detecting element 60. After the exposure of the scene is completed, the electron charges in the light detecting elements 60 are shifted to the CCD shift register 70. The electron charges in the CCD shift register 70 are then transferred to the output register 80 row by row in a sequential fashion. The electron charges, arranged in rows in the output register 80, are again sequentially shifted through amplifier 90 and to the analog-to-digital converter (A/DC) 100. The analog signals of the electron charges are converted to digital voltages at the A/DC 100, which together constitute the pixel values at each pixel of the two dimensional image file corresponding to the scene. The sequential pixel values output from the image sensor 20 are received by the image processing unit 30 as controlled by the microcontroller 50. The image data can then be processed, displayed can be transferred to the printer via a cable and a wireless port for printing.

The above described electronic camera printer system has the following disadvantages: first, the system is not compact; second, the electron charge transfer within and from the CCD image sensor are conducted in a sequential fashion, which is time consuming. Finally, in order to produce images, the digital output of the camera has to be transferred to a storage medium such as a floppy disk or electronic memory. This medium is used to transfer the images to a display device such as a monitor or to a separate printing device.

SUMMARY OF THE INVENTION

It is an object of this invention is to provide an electronic camera which is capable of capturing images and printing images.

It is another object of the present invention to provide a structure which can readily accommodate both an image capture device and a printing device.

It is a further object of this invention to provide a camera type structure which can include a sensor and a printer and which uses a minimum amount of space.

These objects are achieved by an electronic camera for producing a digital image and a multimode microfluidic printing device for printing such digital image, comprising:

a) parallel associative interface means including:
   i) an image sensor in the camera for producing digital images;
   ii) a microfluidic printing device including a plurality of colored ink reservoirs including several reservoirs for containing different colorants and a plurality of colorant delivery chambers; and
   iii) means responsive to digital image produced by the sensor for image processing the digital image produced by the image sensor and for controlling the microfluidic printing device to deliver colorants from the delivery chambers to an image transfer position; and b) means for delivering an image receiving medium to the image transfer position so that colorant is delivered to such medium to produce a visual image of the digital image.

ADVANTAGES

A feature of the present invention is that the image sensor, the printing device and the means for transferring information between the image sensor and the printing device can all be fabricated as an integrated electromechanical system, for example, one substrate such as a semiconductor wafer.

Another feature of the present invention is that CCD (Charge Coupled Device) and CMOS (Complementary Metal-Oxide Semiconductor) image sensors can both be incorporated into the present invention.

A further feature of the present invention is that the printed or display image size can be varied in size by the parallel associative circuit.

Still another feature of the present invention is that the invention is compatible with both one or two dimensional image sensors and printing devices.

BRIEF DESCRIPTION OF THE DRAWINGS

FIGS. 7a and 7b show in more detail the image enlarging circuitry in FIG. 7;

DETAILED DESCRIPTION OF THE INVENTION

Figure 1:
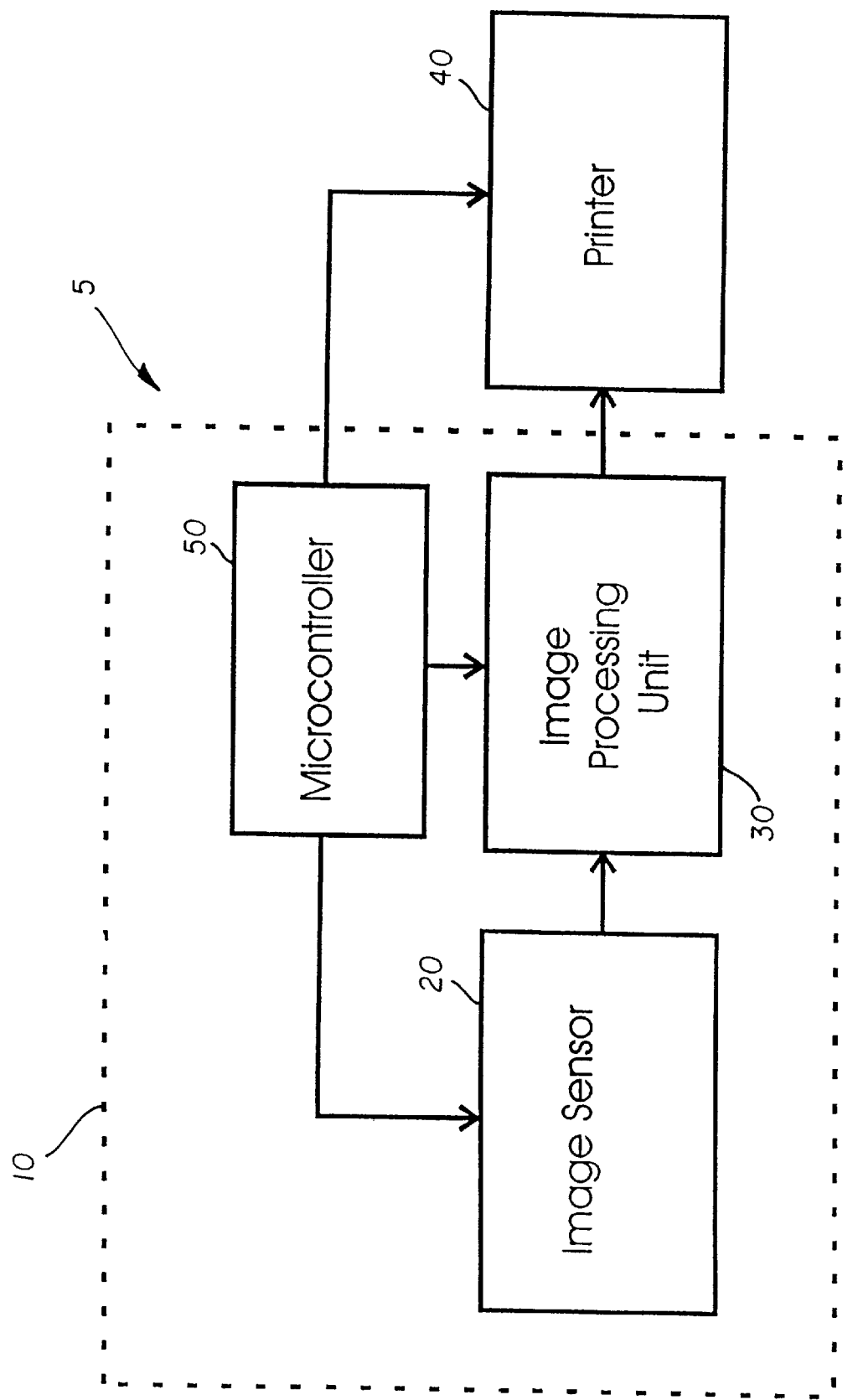
FIG. 1 is a block diagram of a prior art camera-printer system in the prior art.
Figure 2:
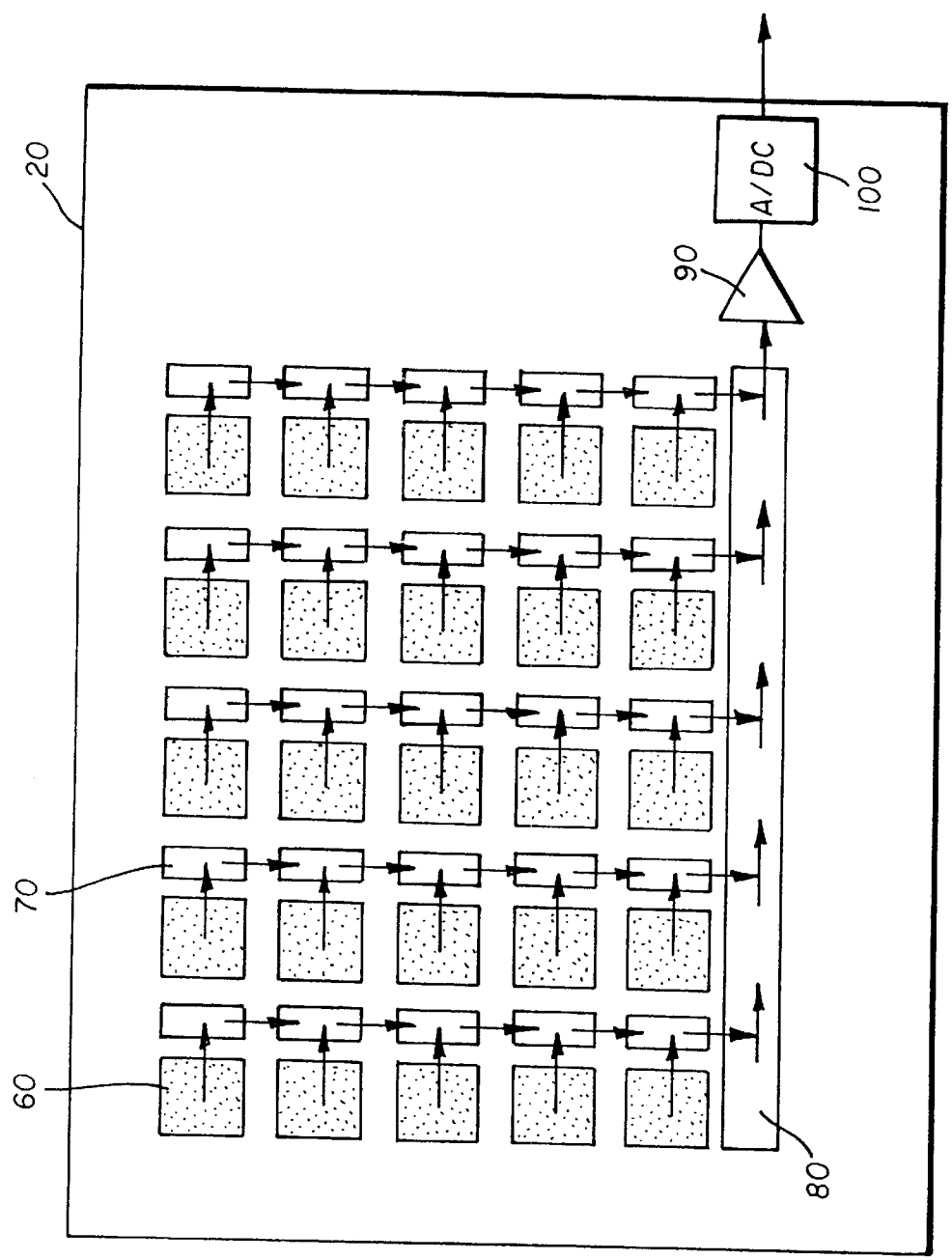
FIG. 2 is a schematic layer of a prior art CCD image sensor in block 20 of the camera-printer system in FIG. 1.
Figure 3:
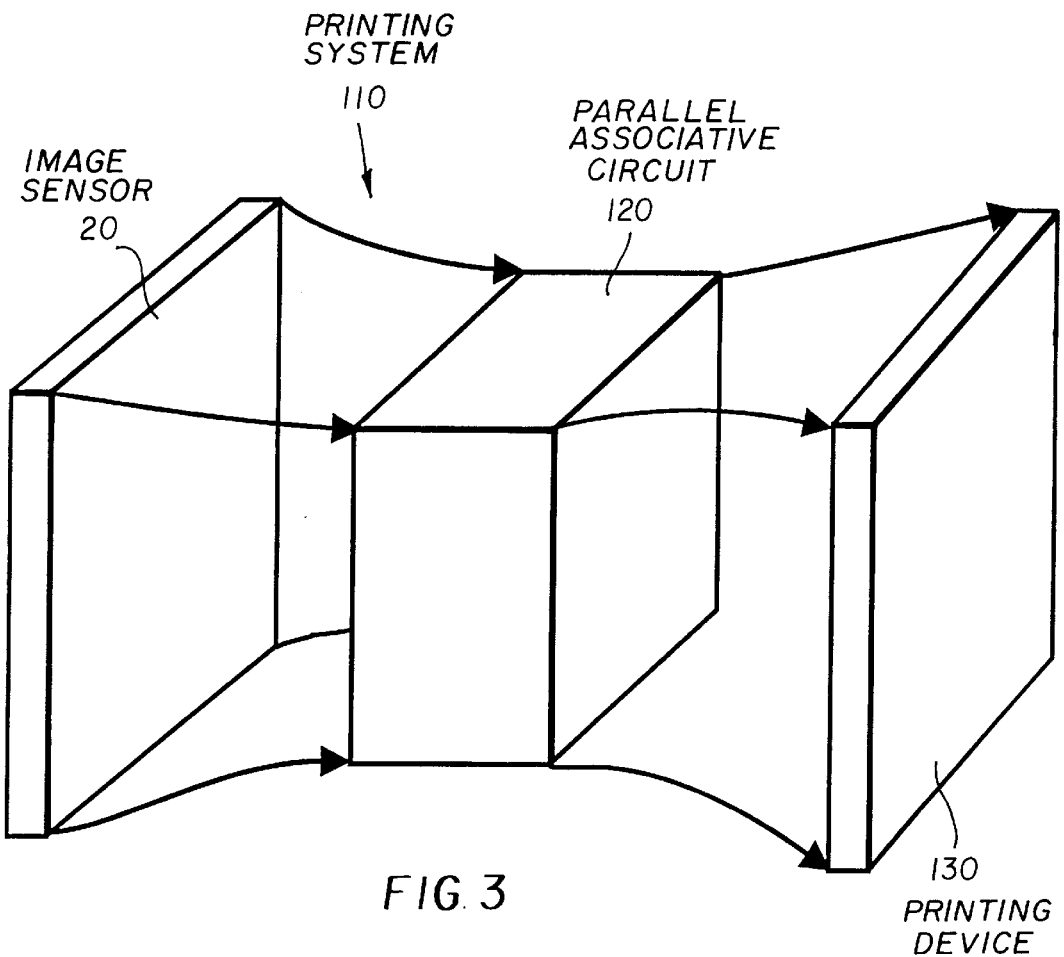
FIG. 3 is a schematic diagram of the important features of the present invention showing the location of an image sensor, a printer, and a parallel associative circuit between the image sensor and the printer.

FIG. 3 shows an image capture and printing system 110 in accordance with the present invention. The system includes an image sensor 20, a printing device 130, and a parallel associative circuit 120. The image sensor 20 can be a Charge Coupled Device (CCD) or a CMOS device described below. Unlike the CCD image sensor shown in FIG. 2, the electron charges or voltage signals output from the image sensor 20 in FIG. 3 can be transferred in parallel to the printing device 130. Furthermore, the image sensor 20 which comprises a plurality of light sensitive elements, the printing device 130, and the parallel associative circuit 120 can all be fabricated in an integrated electromechanical system, which can formed on one semiconductor wafer, as described later. Although two dimensional image sensors and two dimensional printing devices are shown in FIG. 3, it is understood that the present invention is compatible with other geometric configurations. For example, a one dimensional image sensor array and a linear printing device can be used in the present invention. In the present invention, the term printing device (as used to illustrate 130 in FIG. 3) refers to a device that can transfer colorant to a receiver and that can be used also for direct display.

The functions of a parallel associative circuit 120 may be performed by combining a variety of devices, for example certain types of charge coupled devices in conjunction with other circuitry, such as CMOS circuitry, and other micro-fabricated structures, such as electrokinetic pumps. The electrokinetic pump, which is also known as an electroosmotic pump, has been disclosed by Dasgupta et al., see "Electroosmosis: A Reliable Fluid Propulsion System for Flow Injection Analyses", Anal. Chem. 66, pp. 1792–1798 (1994). The electro kinetic pumps are used here only as an example to illustrate the invention concept. Many other types of pumps can be also used in the present invention, which can include the piezoelectric micropumps, piston pumps, peristaltic micropumps, and gas pressurized pumps as is well known in the art of microfluidics. The printing device can also deliver the colorants through means different from the pumps. For example, the printing device disclosed in the commonly assigned European Patent 763 430 A2 can be used as the printing device 130 in the present invention.

CCDs are typically made on the front side of semiconductor substrates and capture and store high resolution color images as electron charge in image pixels and are manufactured using the techniques and materials of VLSI fabrication technology, permitting inexpensive fabrication of CMOS circuitry and microfluidic components. Electron charge may later be read out pixel by pixel in serial fashion, as is well known in the art of charge coupled devices. Certain types of CCDs, vertical charge transfer CCDs, can additionally transfer such electron charge to the back side of the semiconductor substrate on which the CCD is built as is well known in the art of charge transfer devices, in particular substrate depletion devices. In accordance with the present invention, charge transfer to additional CMOS circuitry and electrokinetic pumps on the substrate backside enables the additional circuitry provided on the backside to perform functions critical to the parallel associative circuit.

Figure 4A:
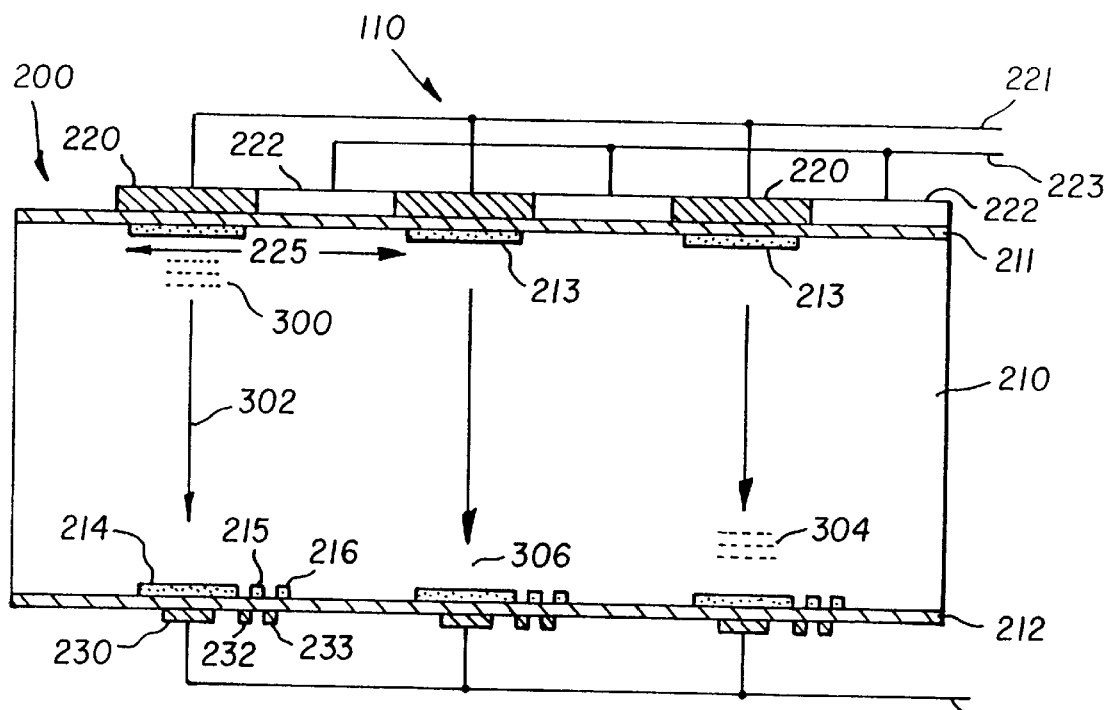
FIGS. 4a–d is are schematic diagrams of the image capture and printing device in accordance with the present invention.
Figure 4B:
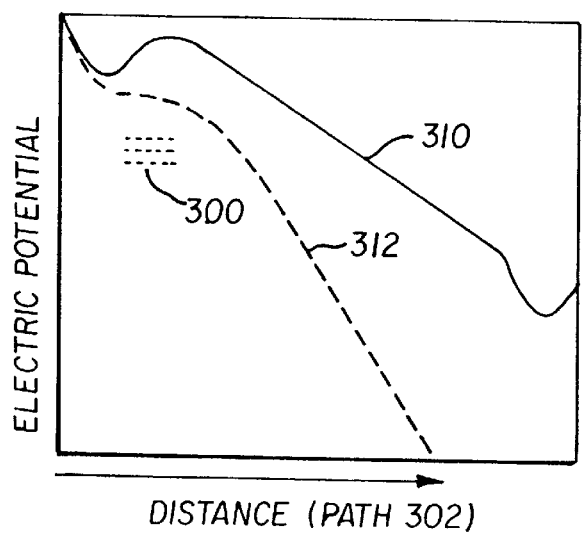
Figure 4C:
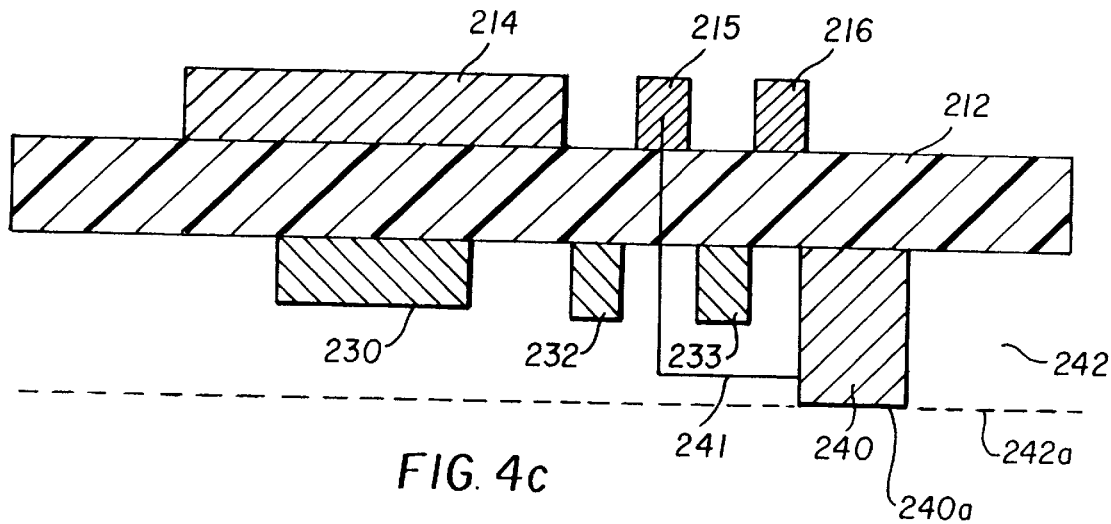
Figure 4D:
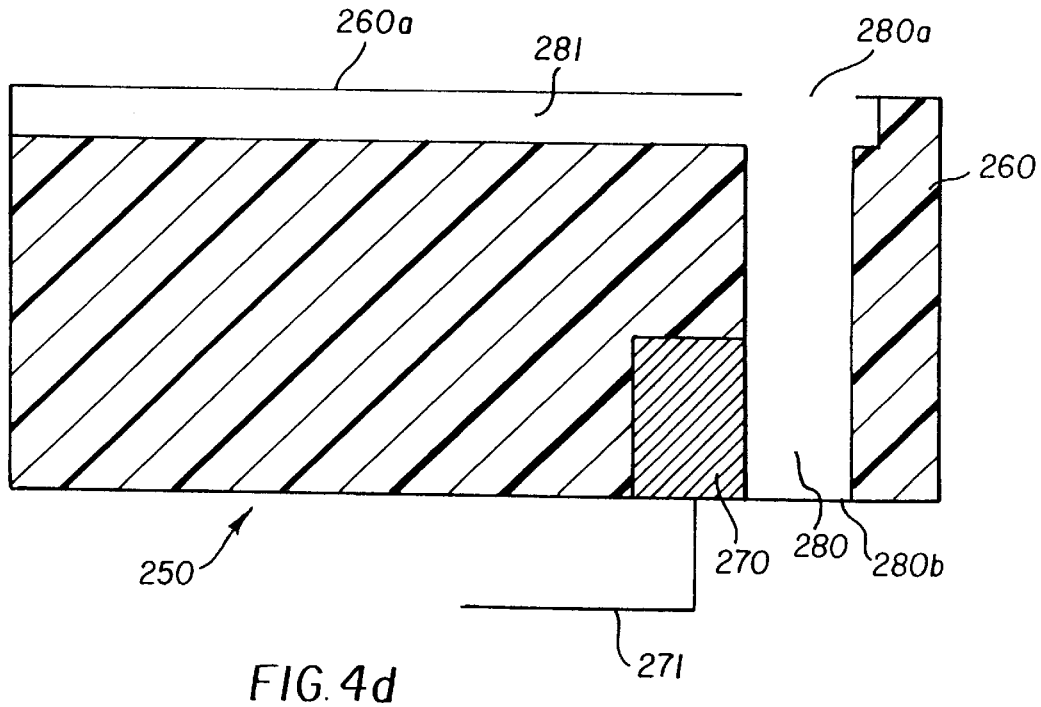

Referring to FIGS. 4a–d, a portion of a preferred embodiment of the parallel associative circuit is shown comprising a vertical charge transfer CCD 200 (FIG. 4a) and a fluid channel array 250 (FIG. 4d).

A vertical charge transfer CCD 200 is made in a silicon substrate 210 of a first conductivity type having a top gate dielectric 211 and a bottom gate dielectric 212. A plurality of top gate electrodes 220 and 222, electrically isolated from one another, are disposed on top gate dielectric 211. Each pair of such electrodes 220–222 form an image gathering pixel 225, as is well known in the art of charge coupled devices. Optical images projected on top gate electrodes 220 and 222 cause charge to accumulate in image gathering pixels 225 at implants 213 of a second conductivity type in silicon substrate 210. Top gate electrodes 220 are connected together by interconnects 221, and likewise top gate electrodes 222 are connected together by interconnects 223 in order that electrical signals corresponding to the optical images formed on the CCD can be read out electrically. This is accomplished in the conventional manner for CCDs, by clocking charge to a common amplifier not shown.

In accordance with the present invention, charges in image gathering pixels 225 may also be swept to implants 214 of a second conductivity type, by application of a transfer voltage to interconnect 231, which electrically connects transfer electrodes 230 on the side of charge transfer CCD 200 opposite the side on which the optical image is formed. Each implant 214 is thereby associated with a corresponding image gathering pixel 225.

FIG. 4b shows a schematic diagram of the electric potential in silicon substrate 210 along path 302 (see FIG. 4a) before application of the transfer voltage (line 310 in FIG. 4b) and after application of the transfer voltage to interconnect 231 (line 312 in FIG. 4b). The horizontal axis and arrow in FIG. 4b corresponds to a measure of the distance down into substrate 210 starting at top gate dielectric 211 such as path 302. Electron charges 300 are typically stored in some or all of implants 213, and is transferred vertically to associated implants 214 lying directly beneath implants 213. Electron charges 300 stored in implants 213 are shown in FIGS. 4a and 4b at the beginning of a charge transfer along path 302. Electron charge 304 at the end of a different charge transfer is shown in FIG. 4a. The amount of charge stored and transferred is proportional to the amount of light incident on image gathering pixels 225, as is well known in the art of charge coupled devices.

FIG. 4c shows a detailed view of bottom gate dielectric 212 of FIG. 4a and implant 214 of FIG. 4a where charge resides after charge transfer across semiconductor substrate 210. As is well known in the art of solid state charge transfer devices, charge transferred to each implant 214 may again be transferred along gate dielectric 212 to other implants in semiconductor substrate 210 such as storage node 215 by applying a transfer voltage to gate electrode 232. Charge transferred in this manner alters the voltage on storage node 215 which is connected electrically by interconnect 241 to first fluid contact electrode 240. The use of separate implants 214 and 215 to store charge transferred form implants 213 simplifies the transfer of charge across semiconductor substrate 210 because the chance of accidental charge transfer from other implants such as implant 216 is reduced. Fluid contact electrode 240, having surface 240a, may be fabricated by methods common in the art of VLSI technology. Such methods include plug fabrication technology. The electrode 240 is preferably disposed in passivation layer 242, preferably made of silicon oxide, with surface 240a coplanar with surface 242a. The surfaces 240a and 242a form the bottom surface of vertical charge transfer CCD 200. The implant 216 is formed of a second conductivity type, and is held at a predetermined voltage. As is well known in the art of solid state charge transfer devices, the level of charge on storage node 215 may be reset to a predetermined value by applying a transfer voltage to gate electrode 233. The gate electrode is disposed between implants 215 and 216. The charge on implant 214 may be reset to a predetermined value by applying a transfer voltage to gate electrodes 232 and 233.

FIG. 4d shows a fluid distribution layer 250 having a substrate 260 with a top surface 260a; a fluid print channel 280 having a top opening 280a and bottom opening 280b; a fluid supply channel 281 which supplies fluid to fluid print channel 280; and a second fluid contact electrode 270. The contact electrode 271 is maintained at a fixed voltage by contact electrode 271. The bottom surface 242a of vertical charge transfer CCD 200 is bonded to the top surface 260a of fluid distribution layer 250 by, for example using an epoxy resin. The bottom surface 240a of first fluid contact electrode 240 is in alignment with the top opening 280a.

In operation of the parallel associative circuit, a colorant fluid capable of electrokinetic pumping, such as an ionic ink, is supplied to fluid print channel 280 through fluid supply channel 281. The voltage of charge storage node 215 and hence of first fluid contact electrode 240 is set to a predetermined value by applying a transfer voltage to gate 233 while maintaining implant 216 at the same predetermined voltage. If second fluid contact electrode 270 is also maintained at the some predetermined voltage, no colorant fluid is pumped out bottom opening 280b because there is no difference in voltage between first and second fluid contact electrodes 240 and 270.

When an image is formed on top electrodes 220 and 222, light from this image is converted to electron charge in implants 214 at each image gathering pixel 225 in accordance with the normal operation of a CCD. If the image is desired to be printed, electron charge is transferred from implants 213 to implants 214 by applying a transfer voltage to gate electrodes 230. Subsequently, the electron charge or a portion of the electron charge at each implant 214 is transferred to implants 215, thereby altering the voltage of implants 215 and hence of first fluid contact electrode 240. Colorant fluid is now pumped out bottom opening 280b driven by the voltage difference between first and second fluid contact electrodes 240 and 270. As colorant fluid is pumped along fluid print channel 280, colorant fluid contacts receiver 290 and is imbibed to form an image corresponding to the original optical image on top electrodes 220 and 222. Also as fluid is pumped along fluid print channel 280, the voltage difference between first and second fluid contact electrodes 240 and 270 decreases since charge is being conducted away from charge storage node 215 through the colorant fluid until the voltage difference is zero and printing stops. In this manner, there is a direct correspondence between the amount of fluid pumped to receiver 290 at each opening 280b and the amount of light on corresponding image gathering pixels 225. This amount of ink pumped for a given light exposure may be increased by replacing interconnect 241 in FIG. 4c by circuitry forming a charge amplifier. Such amplifiers are well known in the art of active pixel imagers known also as CMOS imagers in the art of solid state image sensors. Alternatively, the chemicals pumped through the colorant fluid may be chosen to cause catalytic formation of an image on receiver 290 so that a charge amplifier is not needed.

In a similar manner, the amount of ink pumped for a given amount of light on an image gathering pixel may be increased by replacing interconnect 241 in FIG. 4c by a charge-to-voltage amplifier as is known in the art of solid state image sensors and which will be discussed later in association with a second preferred embodiment of the parallel associative circuit. In this case, the voltage of first fluid contact electrode 240 is changed in proportion to the amount of light falling on corresponding image gathering pixel 225 of FIG. 4a and does not change during printing because none of the electron charge is removed from implant 415. In this case, the rate of fluid pumping, which depends on the voltage of first fluid contact electrode 240 remains constant during printing, and printing must be terminated by separate means, such as removing receiver 290 after a predetermined printing time.

Figure 5:
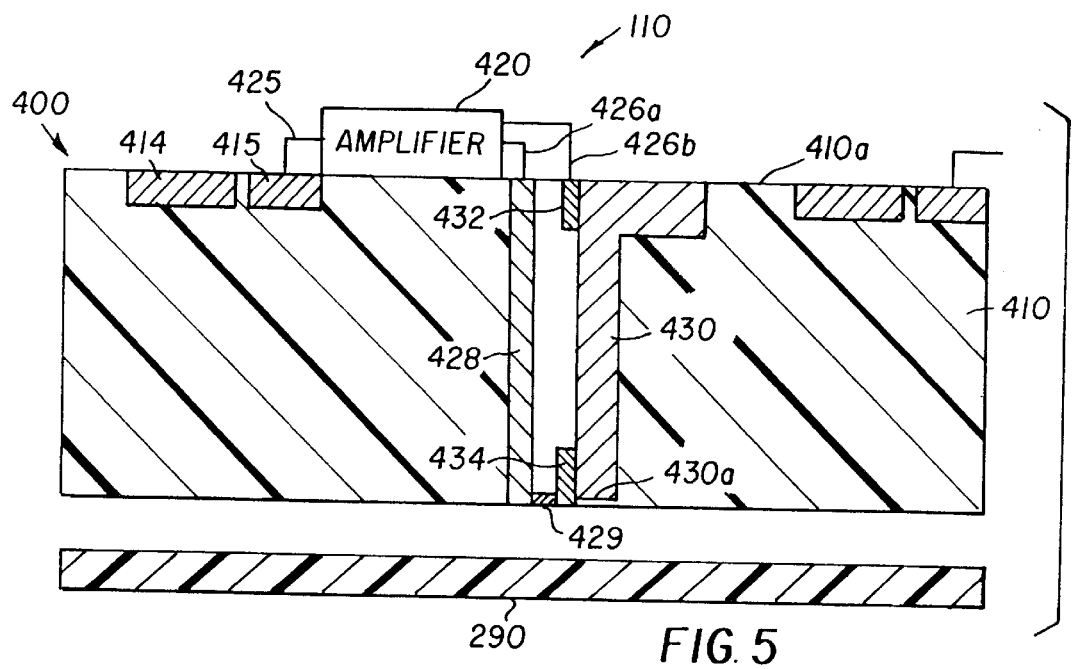
FIG. 5 is a schematic diagram of a second embodiment of the image capture and printing system based on a CMOS technology.

An alternative embodiment of the parallel associative circuit is shown in FIG. 5 and includes comprises charge gathering regions 414 disposed on a substrate 410 having a surface 410a. Charge gathering regions 414 act to convert light to electron charge in a manner similar to that by which the implants 213 in FIG. 4a convert light to charge. Substrate 410 may be silicon, in which case charge gathering regions 414 may be made in a semiconductor substrate by techniques identical to those used to form the CCD structure shown in FIG. 4a. However, because charge is not transferred through substrate 410, substrate 410 may also be made of glass, in which charge gathering regions 414 are preferably deposited conventional amorphous silicon. The amorphous silicon is formed as a thin film as is well known in the art. In accordance with this embodiment, electron charge is transferred to implants 415 on the same side of the substrate 210 on which light falls rather than to the side of substrate 210 opposite to that on which light falls as in the first embodiment of the present invention. Electron charge is transferred to implants 415 by applying a transfer voltage to gate electrodes (not shown) disposed between charge gathering region 414 and implants 415 in a manner similar to that discussed in association with implants 214 and 215 of the previous embodiment. Lead 425 electrically connects implants 415 with a charge-to-voltage amplifier 420. Voltage amplifier 420 include readout circuits which permit selectively reading out of the voltages associated with selected image gathering pixels by external circuits, such circuits being commonly used in CMOS solid state sensors.

FIG. 5 shows colorant fluid channel 430 with first and second fluid electrical connections 432 and 434 respectively disposed at opposite ends of colorant fluid channel 430. First fluid electrical connection 432 is connected to a reference voltage 426b of charge-to-voltage amplifier 420. Second fluid contact electrode 434 is connected to a output voltage 426a of charge-to-voltage amplifier 420 by wafer via conductor 428 which is filled with a metallic conductor and by electrical connection 429. The output voltage 426a is connected to charge-to-voltage amplifier 420 and provides a reference voltage level on conductor 428 to an electrical connection 429 which is located on the other end of the colorant fluid channel 430. The electrical connection 429 is a conductor formed on the substrate 410 and, as shown, is substantially parallel to the colorant fluid channel 430. The conductor 428 can be provided by an etched channel filled with a metal. In such a case, the substrate 410 would not be conductive. If the substrate 410 is conductive, electrical connection 429 may be a conductive lead which can be connected to electrical connection 429.

The operation of the parallel associative circuit in accordance with the embodiment of FIG. 5 functions as follows. Photons are converted to charge in the charge gathering regions 414. At the appropriate time, they are transferred to implants 415. The amplifier 420 converts the charge-to-voltage and applies and electric potential difference between output voltage 426a and reference voltage 426b. The result of this operation is to apply a potential difference between electrical connections 429 and 432. This potential difference creates an electric field that operates on the colorant and the colorant fluid channel 430 as has been discussed above.

An image is printed in a manner similar to that described in the previous embodiment. Colorant fluid capable of electrokinetic pumping, such as an ionic ink is supplied to colorant fluid channel 430 analogous to fluid print channel 280 in FIG. 5, except in accordance with the current embodiment, the colorant fluid channel 430 is made in the same substrate that contains electronically active elements such as charge gathering regions 414 and implants 415 and charge-to-voltage amplifiers 420. When an image is projected on charge gathering regions 414, electrons accumulate in proportion to the light intensity in accordance with the normal operation of a solid state CMOS image sensor. If the image is desired to be printed, electron charge is transferred from charge gathering regions 414 to implants 415 by applying a transfer voltage to gate electrodes 430. Charge so transferred is amplified by charge-to-voltage amplifier 420, producing a voltage difference between first and second colorant fluid contact electrodes 432 and 434 corresponding to the output voltage 426a of charge-to voltage amplifier 420, relative to the reference voltage 426b of charge-to-voltage amplifier 420. This voltage difference causes the colorant fluid such as ionic dyes or pigment suspensions, to be pumped by electrokinetic pumps along colorant fluid channel 430 until the colorant fluid contacts receiver 290 and forms a printed image corresponding to the original optical image. In this manner, there is a direct correspondence between the amount of fluid pumped to receiver 290 at each opening 430a and the amount of light on corresponding charge gathering regions 414.

Figure 6:
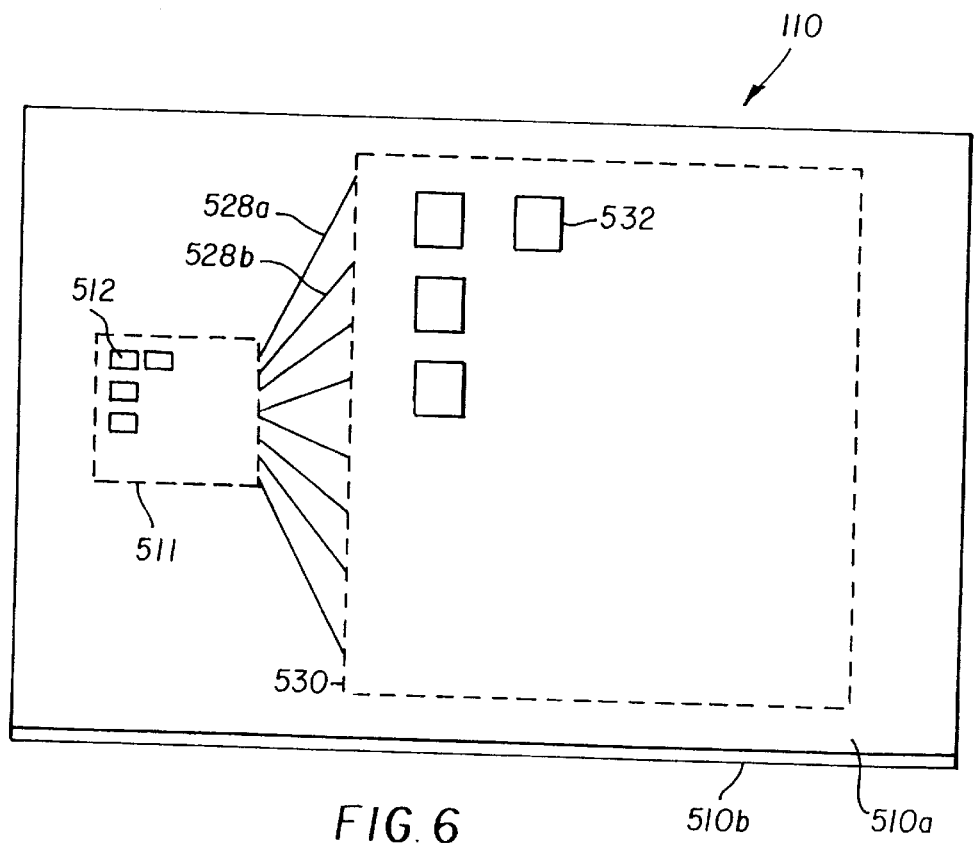
FIG. 6 is a schematic diagram of a third embodiment of the present invention which is capable of enlarging the captured image for printing and displaying in the present invention.

A third preferred embodiment of a parallel associative circuit 120 capable of image-to-print expansion is shown in FIG. 6. This embodiment is advantageous in that it provides printed images of sizes substantially large than the captured optical image. Printed images are generally desired to be large so as to be viewable, whereas optical images, intended to be captured by image capture devices, are generally small for reasons of cost, including the cost of lens optics. The parallel associative circuit 120, according to the third embodiments of the present invention, comprises an image capture device 511 and an image display device 530, both disposed on a substrate 510 having a top side 510a and a bottom side 510b. In accordance with this invention, image display device 530 and image capture device 511 both are disposed the same side of substrate 510, namely top side 510a.

Figure 7B:
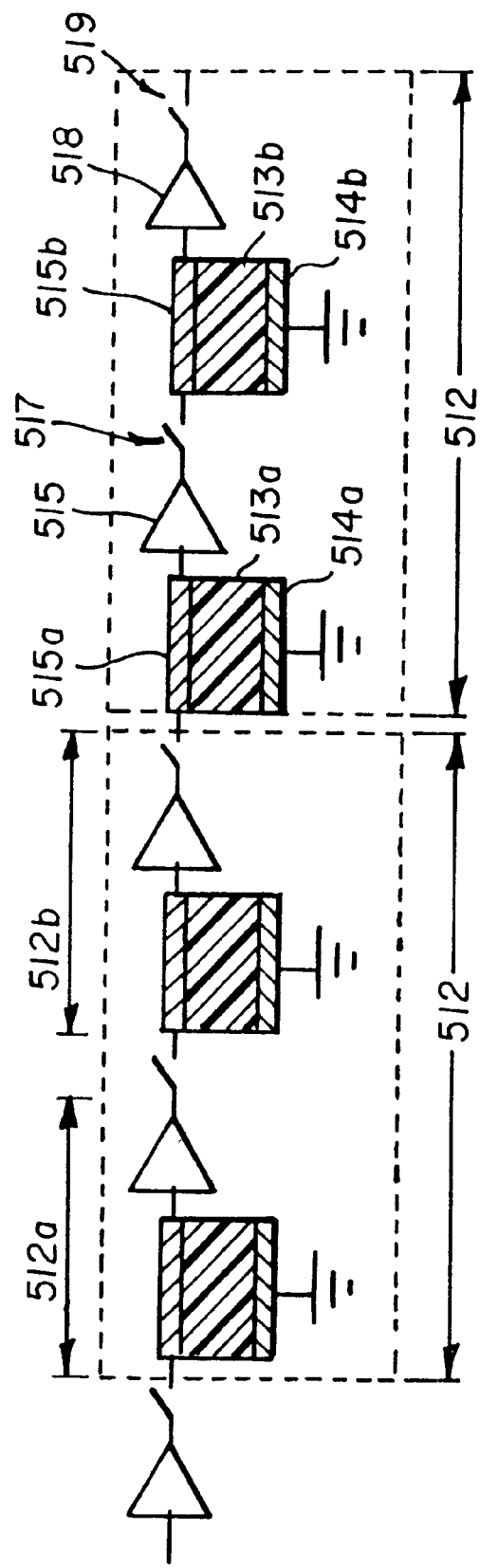

As shown in FIG. 6 and FIG. 7a, image capture device 511 comprises a plurality of image pixels 512 each having associated with it a pair of regions, namely a charge gathering region 512a and a charge storage region 512b (FIG. 7a). Charge gathering regions 512a are preferably made of thin films of amorphous silicon 513a deposited for example by plasma enhanced chemical vapor deposition and sandwiched between a bottom electrode 514a and a transparent top electrode 515a (FIG. 7b). Typically, as shown in FIG. 7b, charge gathering regions 512a are rectangular and of dimensions 2 to 200 microns on a side. Charge gathering regions 512a convert light to electron charge in a manner similar to that by which implants 213 in FIG. 4a convert light to charge, as is well known in the art of amorphous silicon photoreceptor technology. Charge storage regions 512b may also be made of thin films of amorphous silicon 513b, deposited for example by plasma enhanced chemical vapor deposition and sandwiched between a bottom electrode 514b and an opaque electrode 515b. Typically, charge storage regions 512b are also rectangular and of dimensions 2 to 200 microns along each side. Although the charge gathering regions 512a and charge storage regions 512b are shown in FIGS. 6–7 and lying adjacent to one another, this need not be the case. For example, it is possible to fabricate devices having charge storage regions 512b underlying charge gathering region 512a.

As shown in FIG. 7b, the transparent top electrode 515a of each image pixel is connected electrically to the input of one of a plurality of pixel voltage follower amplifiers 516. The output of pixel voltage follower amplifier 516 is connected electrically to opaque top electrode 515b of the charge storage region of the same image pixel through one of a plurality of CMOS switches 517. In a likewise manner, as shown in FIG. 7b, adjacent image pixels 512 in horizontal rows are connected electrically, the opaque top electrode 515b of one image pixel being connected electrically to the input of one of a plurality of transfer voltage follower amplifiers 518. The output of transfer voltage follower amplifiers 518 is connected electrically to transparent top electrode 515a of the next horizontally adjacent image pixel 512 (which for simplicity is not shown in FIG. 7b) through one of a plurality of transfer CMOS switches 519. The technology of circuitry such as voltage follower amplifiers, CMOS switches, and electrical connections is well known in the art of thin film electronics.

Electron charge can be transferred from charge gathering regions 512a to charge storage regions 512b by applying a transfer voltage pulse Vt to pixel CMOS switches 517. Likewise, electron charge can be transferred from charge storage regions 512b of one of the plurality of image pixels 512 to image gathering regions 512a of a horizontally adjacent image pixel 512 provided the two image pixels are connected electrically by applying a transfer voltage pulse Vt to transfer CMOS switches 517.

As is well known in the art of charge transfer bucket brigade devices, electrically connected pairs of regions such as image gathering regions 512a and charge storage regions 512b which can store electron charges can be used to transfer charges from one region of a pair to the same region of the electrically connected pair. This is accomplished in the present embodiment by first transferring the charge in the image gathering regions 512a in each image pixel 512 in FIGS. 7a and 7b to the charge storage region 512b of the same image pixel 512 by turning on CMOS switches 517 (FIG. 7b) in all image pixels 512, and by then transferring the charge in the charge storage regions 512a in each image pixel 512 in FIGS. 8a and 8b to the image gathering regions 512b of the adjacently located image pixels 512, the adjacently located pixel being the next image pixel 512 along a line of electrically connected pixels in the direction of charge transfer. This transfer is accomplished by turning on CMOS switches 519 (FIG. 7b) in all image pixels 512.

Figure 8A:
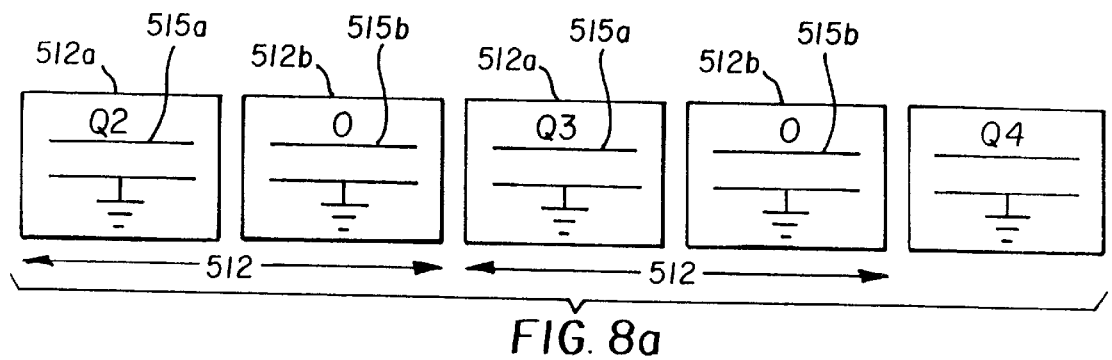
FIGS. 8a–8c are schematic electric diagrams of the charge transfer devices shown in FIG. 7a and FIG. 7b.
Figure 8B:
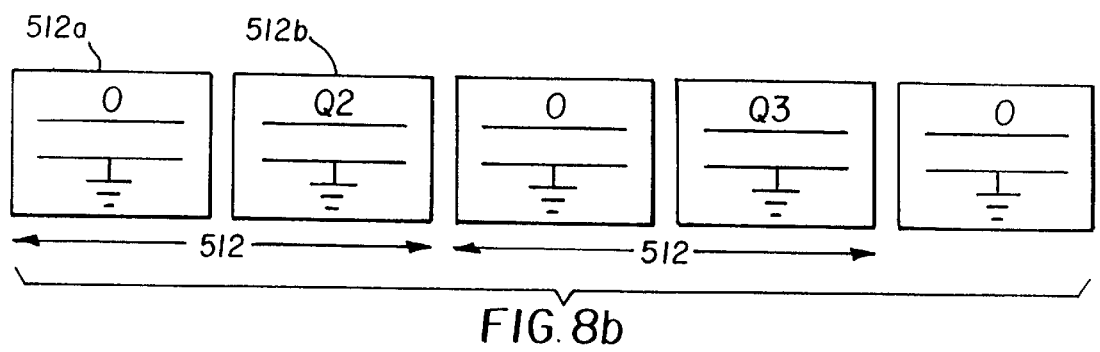
Figure 8C:
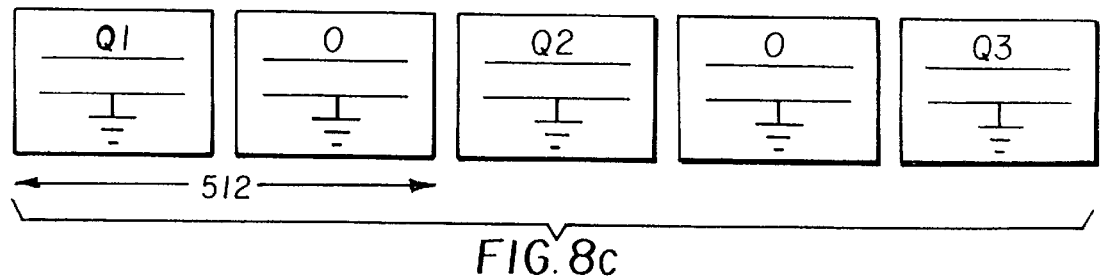

FIGS. 8a–8c schematically shows a linear pattern of charges Q2, Q3, Q4, which are part of the image pixels of line 529 in FIG. 7a. Charges contained in each image gathering region of electrically connected image pixels 512 along a line from left to right. The linear pattern of charges Q2, Q3, Q4 shown in FIG. 8a can be translated to the right without altering the pattern of the charges, for example, by first applying a transfer pulse to all CMOS switches 517 (FIG. 7b) connected to the outputs of voltage follower amplifiers themselves connected to transparent top electrodes 515a, resulting in the translated linear pattern of charges Q2, Q3, Q4 shown in FIG. 8b. Similarly, the linear pattern of charges Q2, Q3, Q4 shown in FIG. 8b can be translated further along the chain of connected pairs without altering the pattern of charges by applying a transfer pulse to all CMOS switches 519 (FIG. 7b) connected to the outputs of voltage follower amplifiers themselves connected to CMOS switches 519 or transparent top electrodes 515a, resulting in the translated linear pattern of charges Q2, Q3, Q4 shown in FIG. 8c. Preferably, all CMOS switches 515 are wired together and all CMOS switches 517 are wired together to save space and cost.

Figure 9:
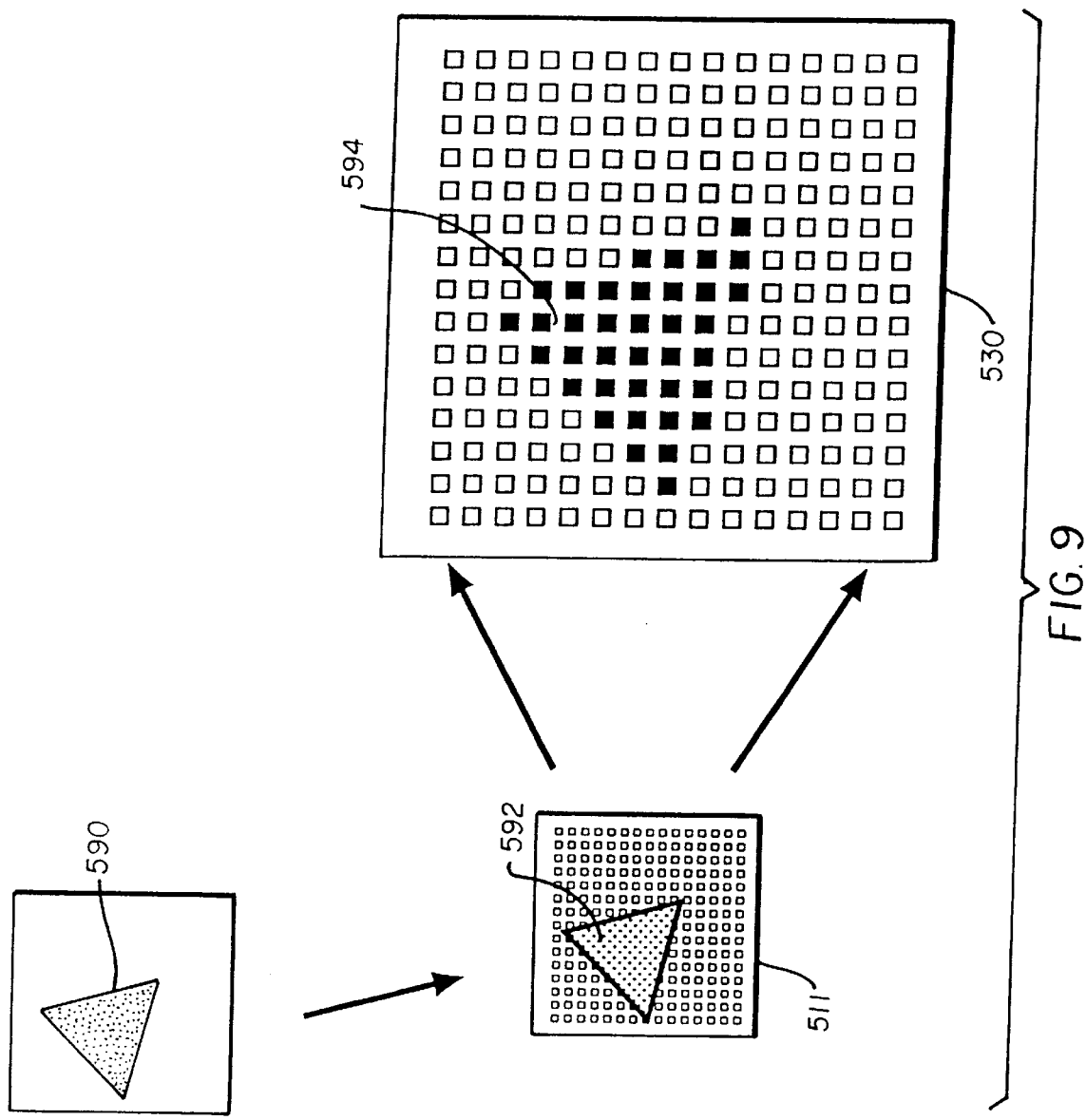
FIG. 9 shows the arrangement of a small image pattern on an image capture device and the corresponding enlarged image pattern on an image display device.

By repeating the steps of first applying a transfer voltage pulse to all CMOS switches 517 and then applying a transfer voltage pulse to all CMOS switches 519 n times, where n is the transfer number, the linear pattern of charges along a line, such as line 529 of FIG. 7a, are translated n pixels. By performing such an operation on a multiplicity of the horizontal lines of image pixels 512 shown in FIG. 7a, a two-dimensional pattern of charges is transferred left to right in FIG. 7a. In particular, if n is large enough, the two-dimensional pattern of charges initially in the image pixels of image capture device 511 are transferred to the print pixels 532 in display device 530. The utility of transferring the two dimensional pattern of charges is shown in FIG. 9. An image is transferred thereby from an image capture area such as found on image capture device 511 of FIG. 6 by transferring the two-dimensional pattern of charges corresponding to the image many times until the pattern has been moved to an image print area, such as the image print area in image display device 530 of FIG. 6. In FIG. 9, a two-dimensional pattern of charges 592 resulted from projecting an image 590 optically on image capture device 511, an analog voltage pattern 594 corresponding to image 590 is transferred to voltage follower amplifiers 516 (FIG. 7b) in image display device 530. A representation of the image 590 that may be used in accordance with this invention for controlling liquid ink printing. This is accomplished by the structures shown in FIG. 5. Reviewing colorant fluid channels such as 430 (FIG. 5) with first and second fluid electrical connections 432 and 434 respectively disposed at opposite ends of colorant fluid channel 430, the first fluid electrical connections 432 are connected to a common voltage such as ground and the second fluid electrical connection 434 connected electrically to the outputs of voltage followers 516 at each image pixel 512 in the display device 530.

The operation of the parallel associative circuit in accordance with this embodiment is similar to that of the previous embodiments except that the display device 530 is substantially larger than the image capture device 511, preferably by a large factor, typically by a factor of from 100 to 10,000 in area but not restricted to this size ratio. This is advantageous in that printed images are generally desired to be large so as to be viewable whereas image capture devices are generally small for reasons of cost, including the cost of lens optics.

An image is printed in a manner similar to that described in the previous embodiment. Colorant fluid capable of electrokinetic pumping, such as an ionic ink is supplied by colorant fluid supply channels similar to fluid supply channels 410c in FIG. 5 supplies colorant fluid to colorant fluid channels 430 in FIG. 5. When an image is formed on image capture device 511, electron charge accumulates in proportion to the light intensity in accordance with the normal operation of a solid state sensor. If the image is desired to be printed, electron charge is transferred from image capture device 511 to display device 530 by repeatedly applying the operations of first applying a transfer voltage pulse to all CMOS switches 515 and then applying a transfer voltage pulse to all CMOS switches 519. Charge so transferred is causes CMOS switches 515 to produce an imagewise two dimensional array of voltage difference between first and second colorant fluid contact thereby causing colorant fluids to be pumped into contact with a receiver. This is similar to the situation previously discussed where receiver 290 is placed in contact with display device 530. Ink is imbibed to form an image corresponding to the original optical image. In this manner, there is a direct correspondence between the amount of fluid pumped to the receiver, which is generally large in size, and the amount of light on corresponding charge gathering, which is generally small.

It will be understood to those skilled in the art that the present invention is not limited to having a microfluidic printing device and an image sensor mounted on the same substrate but that these devices can be mounted on separate substrates and integrated electrically.

The invention has been described in detail with particular reference to certain preferred embodiments thereof, but it will be understood that variations and modifications can be effected within the spirit and scope of the invention.

PARTS LIST

Q2 charges
Q3 charges
Q4 charges
5 camera-printer system
10 camera
20 image sensor
30 an image processing unit
40 printer
50 microcontroller
60 light detecting elements
70 CCD shift register
80 output register
90 amplifier
100 analog-to-digital converter (A/DC)
110 image capture and printing system
120 parallel associative circuit
130 printing device 210 silicon substrate
211 top gate electrode
212 bottom gate dielectric
213 implants
214 implants
200 vertical charge transfer CCD
210 semiconductor substrate
212 gate dielectric
213 implants
214 implants
215 charge storage node (implants)
216 implant
220 top gate electrode
221 top gate electrode
222 top gate electrode
223 interconnects
225 image gathering pixel
230 transfer gate electrodes
231 interconnect
232 gate electrode
233 gate electrode
240 first fluid contact electrode
240a surface
241 interconnect
242 passivation layer
242a bottom surface
250 fluid distribution layer
260 substrate
260a top surface
270 second fluid contact electrode
271 contact electrode
280 fluid print channel
280a top opening
280b bottom opening
281 fluid supply channel
290 receiver
300 electron charge
302 path
304 electron charge
410 substrate
410a surface
410c fluid supply channels
414 charge gathering regions
415 implants
420 charge-to-voltage amplifier
425 lead
426a output voltage
426b reference voltage
428 conductor
429 electrical connection
430 colorant fluid channel OR gate electrodes
430a opening
432 first fluid electrical connection
434 second fluid contact electrode
450 colorant fluid channel
510 substrate
510a top side
510b bottom side
511 image capture device
512 image pixels
512a charge gathering region
512b charge storage regions
513 amorphous silicon
513b amorphous silicon
514a bottom electrode
515 CMOS switches
515a transparent top electrode
515b opaque top electrode
516 pixel voltage follower amplifier
517 CMOS switches
518 voltage follower amplifiers
519 CMOS switches
529 line
530 image display device
532 print pixels
590 image
592 two-dimensional pattern of charges
594 analog voltage pattern

What is claimed is:

1. An electronic camera for producing a digital image and a multimode microfluidic printing device for printing such digital image, comprising:
   a) parallel associative interface means including:
      i) a substrate;
      ii) an image sensor mounted on the substrate in the camera for producing digital images;
      iii) a microfluidic printing device being mounted on the substrate including a plurality of colored ink reservoirs including several reservoirs for containing different colorants and a plurality of colorant delivery chambers; and
      iv) circuit means mounted on the substrate and responsive to digital image produced by the sensor for image processing the digital image produced by the image sensor and for controlling the microfluidic printing device to deliver colorants from the delivery chambers to an image transfer position; and
   b) means for delivering an image receiving medium to the image transfer position so that colorant is delivered to such medium to produce a visual image of the digital image.

2. An electronic camera for producing a digital image and a multimode microfluidic printing device for printing such digital image, comprising:
   a) parallel associative interface means including:
      i) a substrate having at least two surfaces;
      ii) an image sensor mounted on one surface of the substrate in the camera for producing digital images;
      iii) a microfluidic printing device being mounted on the other surface of the substrate including a plurality of colored ink reservoirs including several reservoirs for containing different colorants and a plurality of colorant delivery chambers; and
      iv) circuit means mounted on the substrate and responsive to digital image produced by the sensor for image processing the digital image produced by the image sensor and for controlling the microfluidic printing device to deliver colorants from the delivery chambers to an image transfer position; and
   b) means for delivering an image receiving medium to the image transfer position so that colorant is delivered to such medium to produce a visual image of the digital image.

3. An electronic camera for producing a digital image and a multimode microfluidic printing device for printing such digital image, comprising:
   a) parallel associative interface means including:
      i) a substrate having at least two surfaces and being adapted to transfer charge packets;
      ii) an image sensor mounted on one surface of the substrate in the camera for producing charge packets representing the image;
      iii) means mounted on the other surface of the substrate for receiving the charge packets and for producing signals representing the digital image;

iv) a microfluidic printing device being mounted on such other surface of the substrate including a plurality of colored ink reservoirs including several reservoirs for containing different colorants and a plurality of colorant delivery chambers; and v) circuit means mounted on the substrate and responsive to the digital image signals produced by the charge packet receiving means for controlling the microfluidic printing device to deliver colorants from the delivery chambers to an image transfer position; and b) means for delivering an image receiving medium to the image transfer position so that colorant is delivered to such medium to produce a visual image of the digital image.

4. The electronic camera of claim 3 wherein the image sensor comprises a two dimensional array of light detecting elements.

5. The electronic camera of claim 3 wherein the image sensor comprises an one dimensional array of light detecting elements.

6. The electronic camera of claim 3 wherein the image sensor is a CCD (charge coupled device).

7. The electronic camera of claim 3 wherein the image sensor is a CMOS (Complementary Metal-Oxide Semiconductor) device.

8. The electronic camera of claim 3 wherein the parallel associative interface means is capable of resizing the image captured by the image sensor.

9. An electronic camera for producing a digital image and a multimode microfluidic printing device for printing such digital image, comprising:

a) parallel associative interface means including:

i) a substrate having at least two surfaces and being adapted to transfer charge packets;

ii) an image sensor mounted on one surface of the substrate in the camera for producing charge packets representing the image;

iii) an image display device mounted on the same surface of the substrate as the image sensor for receiving charge packets from the image sensor and for producing signals representing the digital image;

iv) a microfluidic printing device being mounted on such other surface of the substrate including a plurality of colored ink reservoirs including several reservoirs for containing different colorants and a plurality of colorant delivery chambers; and v) circuit means mounted on the substrate and responsive to the digital image signals produced by the charge packet receiving means for controlling the microfluidic printing device to deliver colorants from the delivery chambers to an image transfer position; and b) means for delivering an image receiving medium to the image transfer position so that colorant is delivered to such medium to produce a visual image of the digital image.

10. The electronic camera of claim 9 wherein the image sensor includes pixels each having a charge gathering region and a charge storage region.

11. The electronic camera of claim 10 further including means for transferring charge from one pixel to another in the image sensor until the charge is transferred to the display device.

* * * * *